United States Patent
Oesselke et al.

(10) Patent No.: US 10,381,841 B2
(45) Date of Patent: Aug. 13, 2019

(54) DEVICE AND METHOD FOR CONTROLLING DECENTRALIZED POWER GENERATION PLANTS

(71) Applicant: Phoenix Contact GmbH & Co. KG, Blomberg (DE)

(72) Inventors: Thomas Oesselke, Brakel (DE); Björn Sauer, Leonberg (DE); Hans-Peter Pircher, Oberndorf bei Salzburg (AT)

(73) Assignee: Phoenix Contact GmbH & Co. KG, Blomberg (DE)

( * ) Notice: Subject to any disclaimer, the term of this patent is extended or adjusted under 35 U.S.C. 154(b) by 187 days.

(21) Appl. No.: 15/312,015

(22) PCT Filed: May 20, 2015

(86) PCT No.: PCT/EP2015/061095
§ 371 (c)(1),
(2) Date: Nov. 21, 2016

(87) PCT Pub. No.: WO2015/177202
PCT Pub. Date: Nov. 26, 2015

(65) Prior Publication Data
US 2017/0077711 A1    Mar. 16, 2017

(30) Foreign Application Priority Data
May 20, 2014   (DE) .................. 10 2014 107 115

(51) Int. Cl.
*H02J 3/46* (2006.01)
*H02J 13/00* (2006.01)
(Continued)

(52) U.S. Cl.
CPC .................... *H02J 3/46* (2013.01);
*H02J 3/18* (2013.01); *H02J 3/38* (2013.01);
*H02J 3/382* (2013.01);
(Continued)

(58) Field of Classification Search
CPC .......... H02J 3/46; H02J 13/0062; H02J 3/382; H02J 3/18; H02J 13/0006; H02J 3/38;
(Continued)

(56) References Cited

U.S. PATENT DOCUMENTS

2008/0073912 A1    3/2008   Fortmann et al.
2008/0095294 A1*   4/2008   Andrew ................ F01K 23/101
                                                        376/210
(Continued)

FOREIGN PATENT DOCUMENTS

CN          102315645 A     1/2012
CN          102347620 A     2/2012
(Continued)

OTHER PUBLICATIONS

"Steuerungstechnik fur Windkraftanlagen", E tek, Elektrotechnik & Automation fur Emeuerbare Energien, SPS Magazin, Aug. 4, 2011.
(Continued)

*Primary Examiner* — Rexford N Barnie
*Assistant Examiner* — Thai H Tran
(74) *Attorney, Agent, or Firm* — Reising Ethington PC

(57) ABSTRACT

A method for controlling decentralized power generation plants comprises the steps of receiving control commands and/or measuring supply network parameters, processing the received control commands and/or the measured supply network parameters, generating control signals in response to the received control commands and/or the measured supply network parameters for controlling a first power inverter, transmitting the generated control signals to an inverter interface for being output to a first power inverter, adjusting plant parameters, for example the power output of the decentralized power generation plant using the first power inverter in response to the control signals received from the inverter interface. A power generation plant includ-
(Continued)

Example: Mixed plant ing a power generation plant controller for performing the method is also disclosed.

19 Claims, 11 Drawing Sheets

(51) Int. Cl.
  *H02J 3/18* (2006.01)
  *H02J 3/38* (2006.01)
(52) U.S. Cl.
  CPC ...... *H02J 13/0006* (2013.01); *H02J 13/0062* (2013.01); *Y02E 40/30* (2013.01); *Y02E 40/72* (2013.01); *Y04S 10/12* (2013.01)
(58) Field of Classification Search
  CPC .. H02J 3/383; H02J 3/48; Y04S 10/12; Y02E 40/30; Y02E 40/72; Y02E 10/563; G05F 1/66; H02N 6/00
  See application file for complete search history.

(56) References Cited

U.S. PATENT DOCUMENTS

| | | | | |
|---|---|---|---|---|
| 2009/0096211 A1* | 4/2009 | Stiesdal | ............... | H02J 3/1835 290/44 |
| 2011/0125338 A1* | 5/2011 | Perot | ..................... | H02J 3/383 700/292 |
| 2012/0029720 A1 | 2/2012 | Cherian et al. | | |
| 2012/0217807 A1* | 8/2012 | Galler | ..................... | H02J 3/381 307/53 |

FOREIGN PATENT DOCUMENTS

| | | |
|---|---|---|
| CN | 102394497 A | 3/2012 |
| CN | 102810909 A | 12/2012 |
| DE | 102004048341 A1 | 4/2006 |
| DE | 102010023113 A1 | 12/2011 |
| WO | 2013045412 A2 | 4/2013 |

OTHER PUBLICATIONS

PCT Search Report and Written Opinion, Int. Serial No. PCT/EP2015/061095, Int. Filing Date: May 20, 2015, Applicant: Phoenix Contact GmbH & Co. KG, dated Jul. 27, 2015.
German Office Action, Serial No. 10 2014 107 115.8, Applicant: Phoenix Contact GmbH & Co. KG, dated Dec. 23, 2014.
English Translation of International Preliminary Report on Patentability, Int. Application No. PCT/EP2015061095, Filing Date: May 20, 2015, Applicant: Phoenix Contact GmbH & Co., dated Dec. 1, 2016, 10 pages.
Chinese Office Action/Search Report with English Translation, CN Application No. 201580025884.9, Applicant: Phoenix Contact GmbH & Co. KG, Title: Device and Method for Controlling Decentralized Power Generation Plants, dated Mar. 20, 2019.
Indian Associate correspondence correcting patent reference number on India Examination Report, Application No. 201637039334, Title: Device and Method for Controlling Decentralized Power Generation Plants, dated Jun. 8, 2019.
India Examination Report, Application No. 201637039334, Title: Device and Method for Controlling Decentralized Power Generation Plants, dated May 28, 2019.

\* cited by examiner

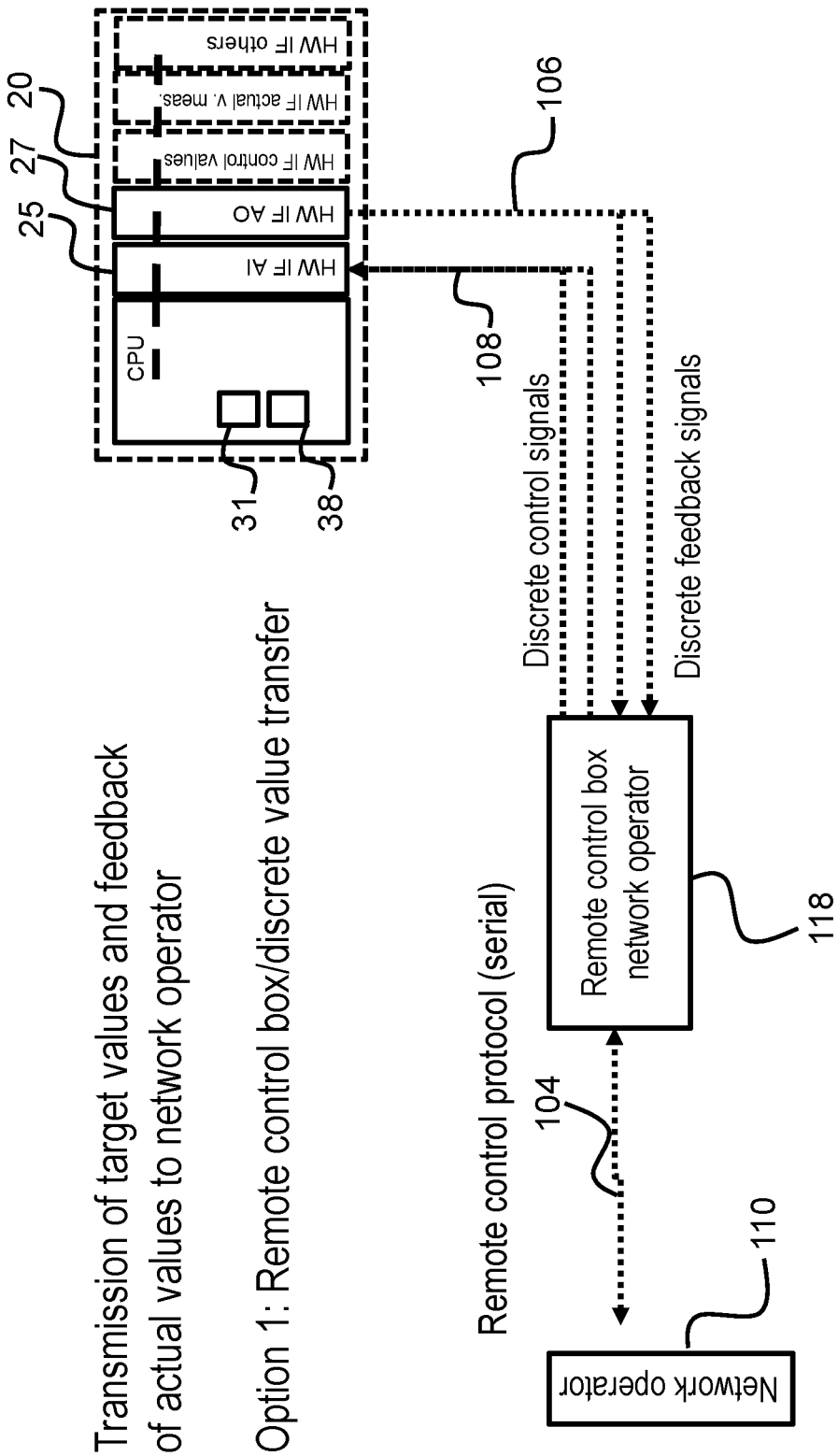

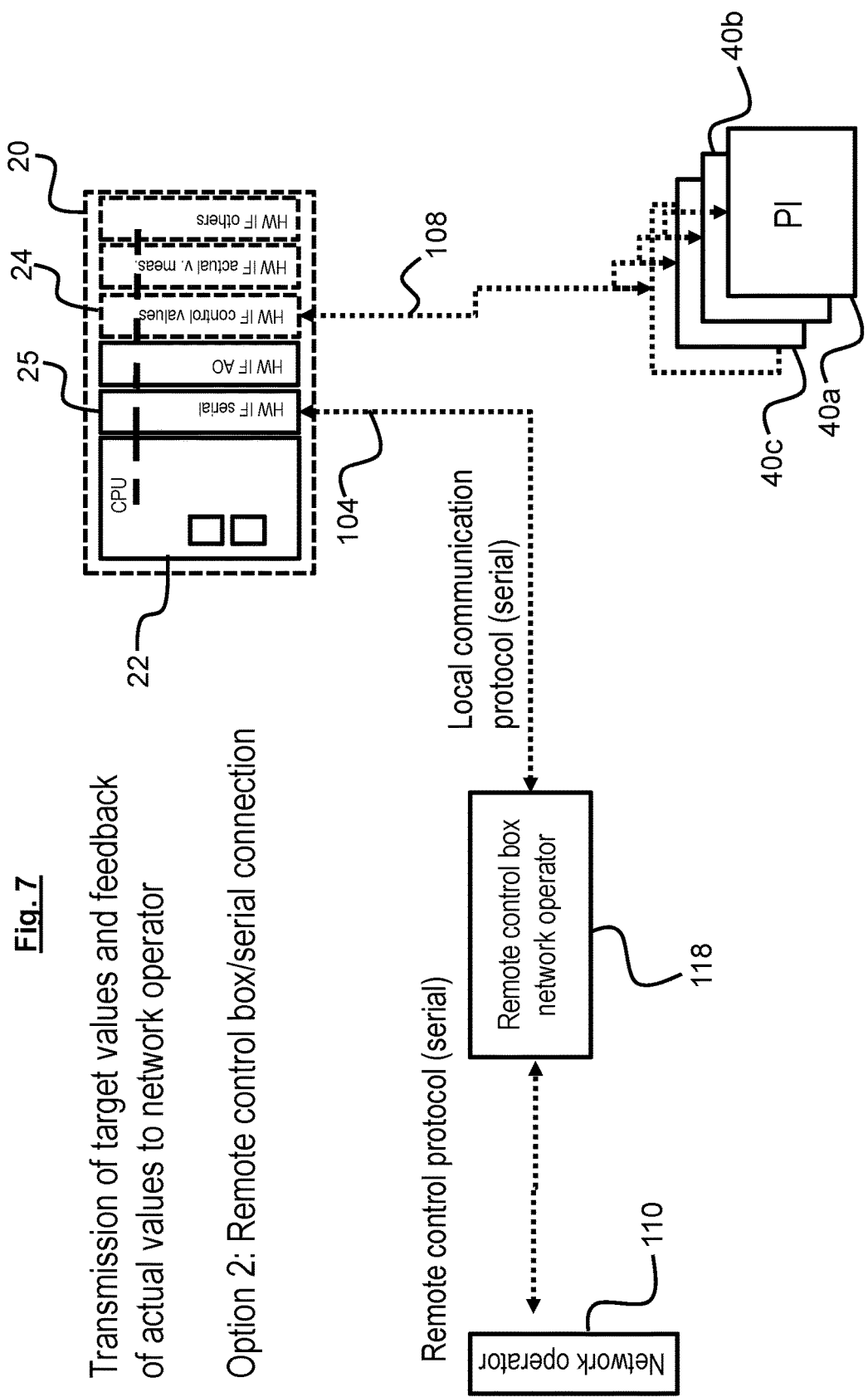

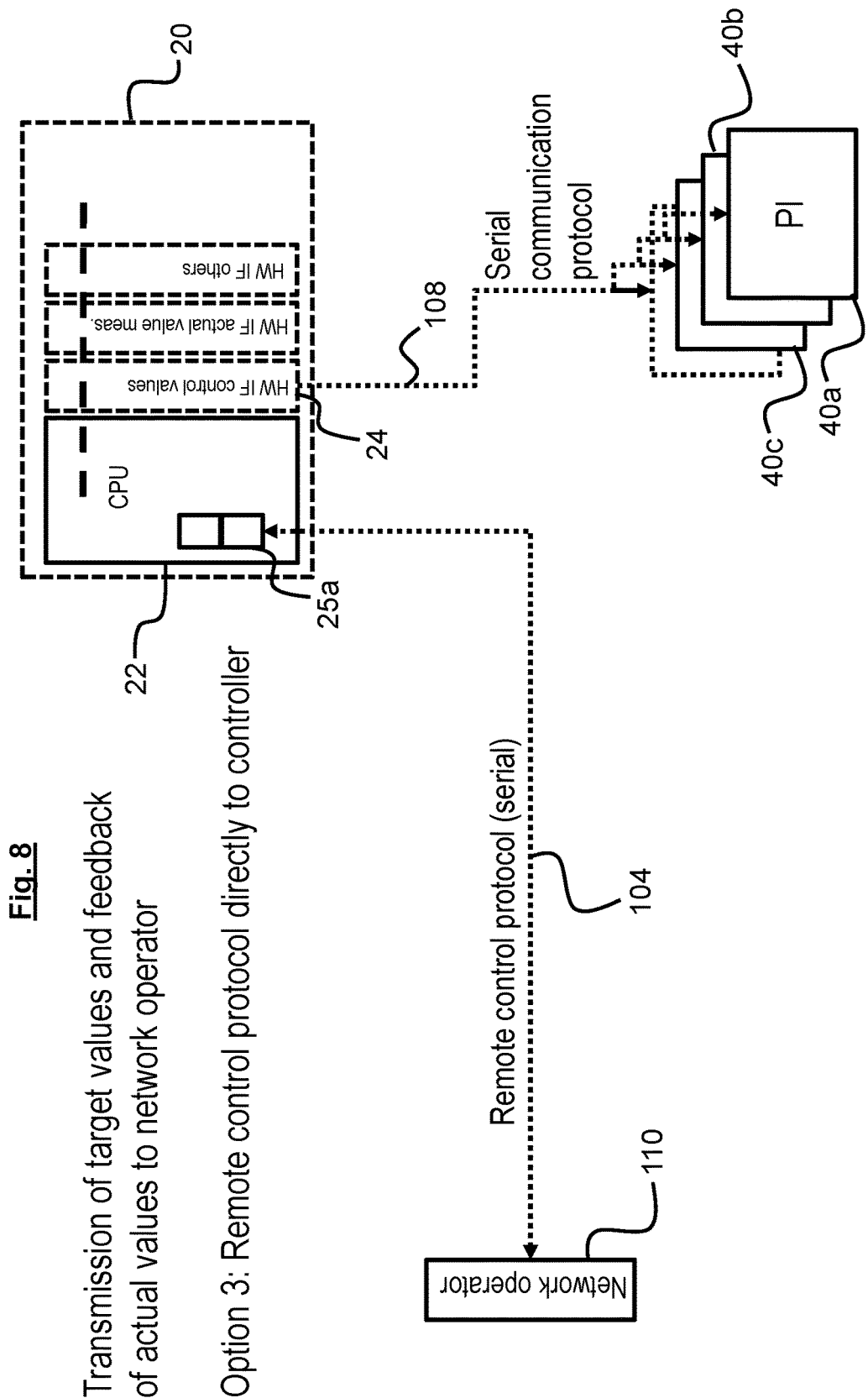

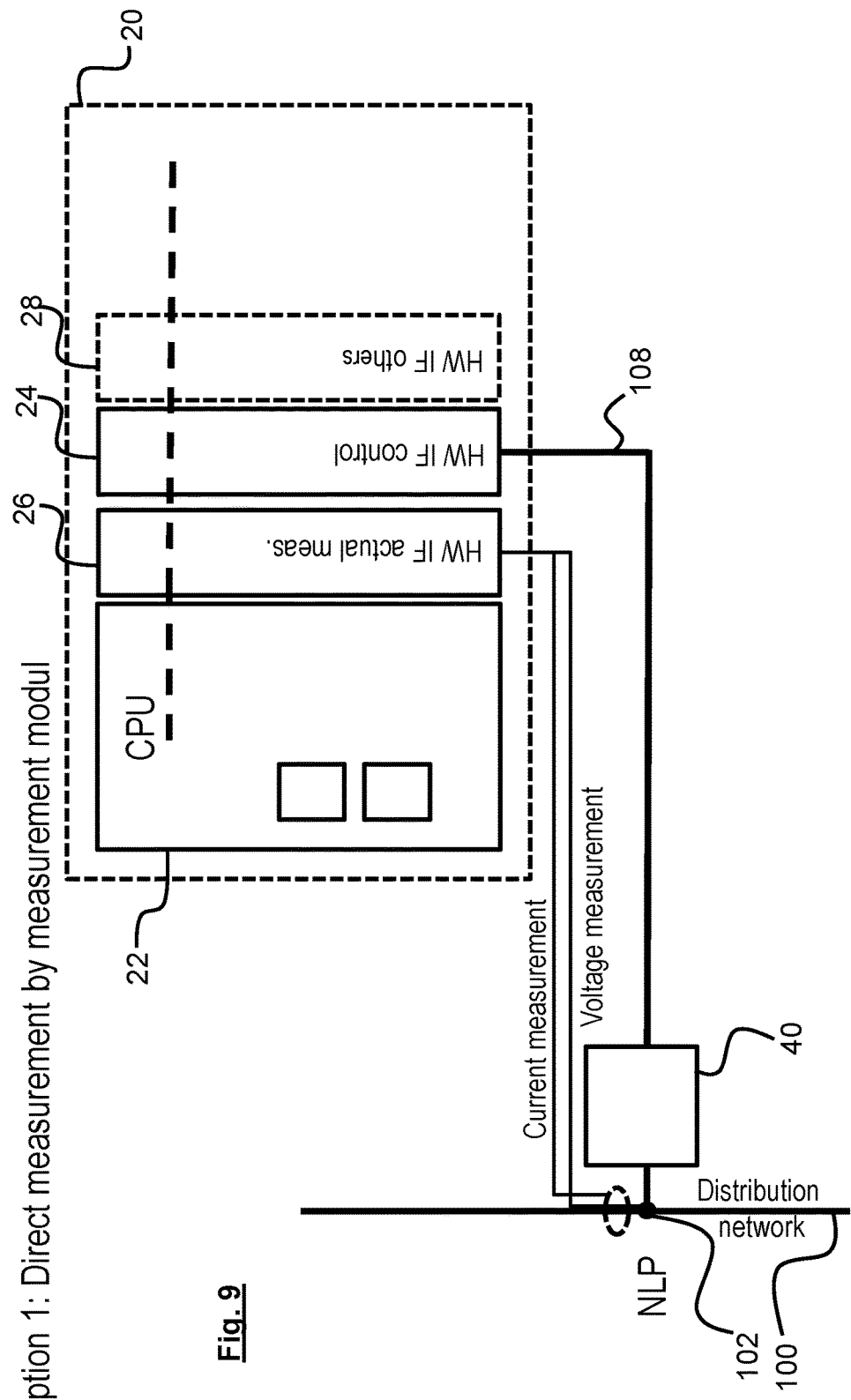

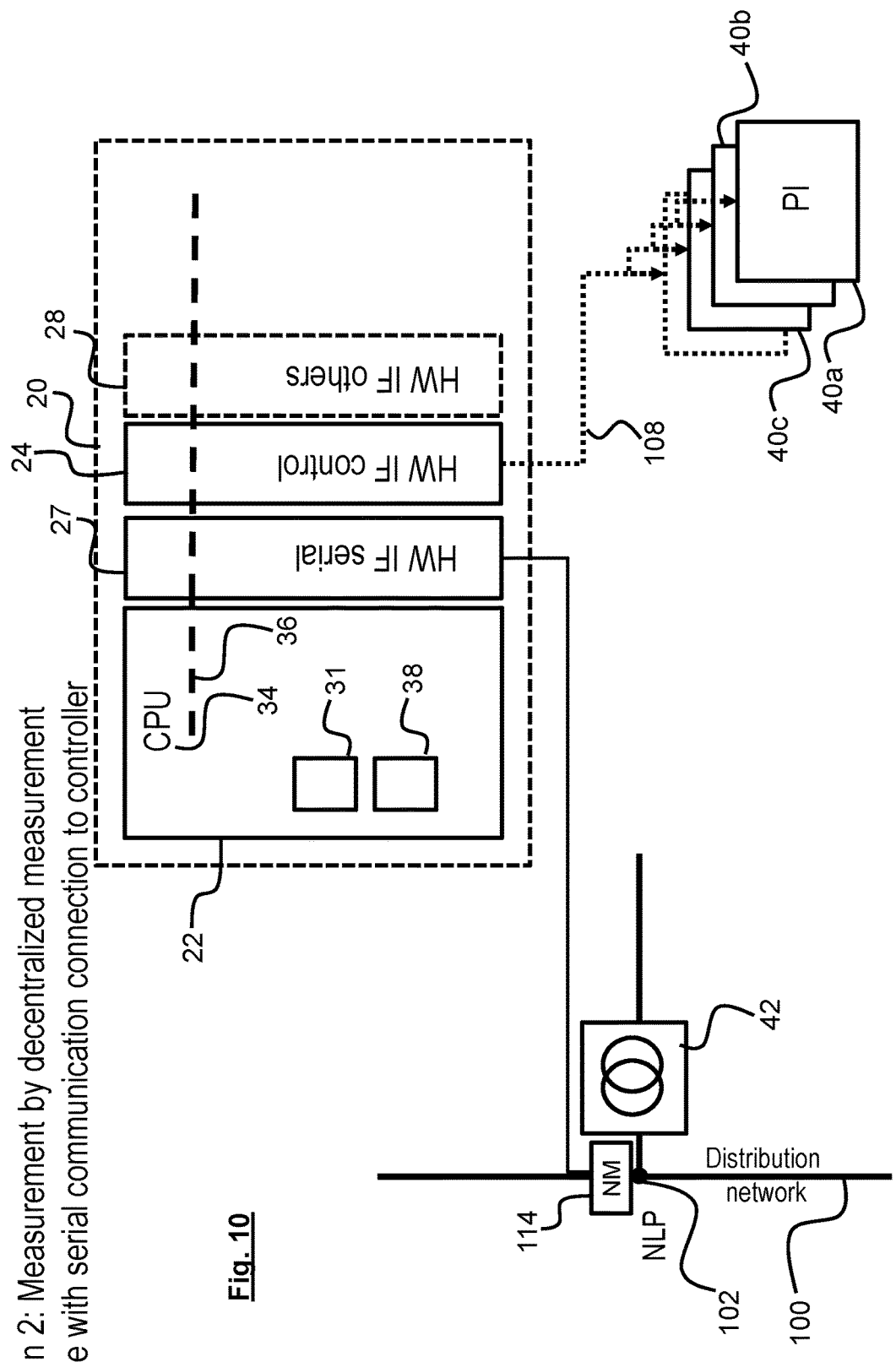

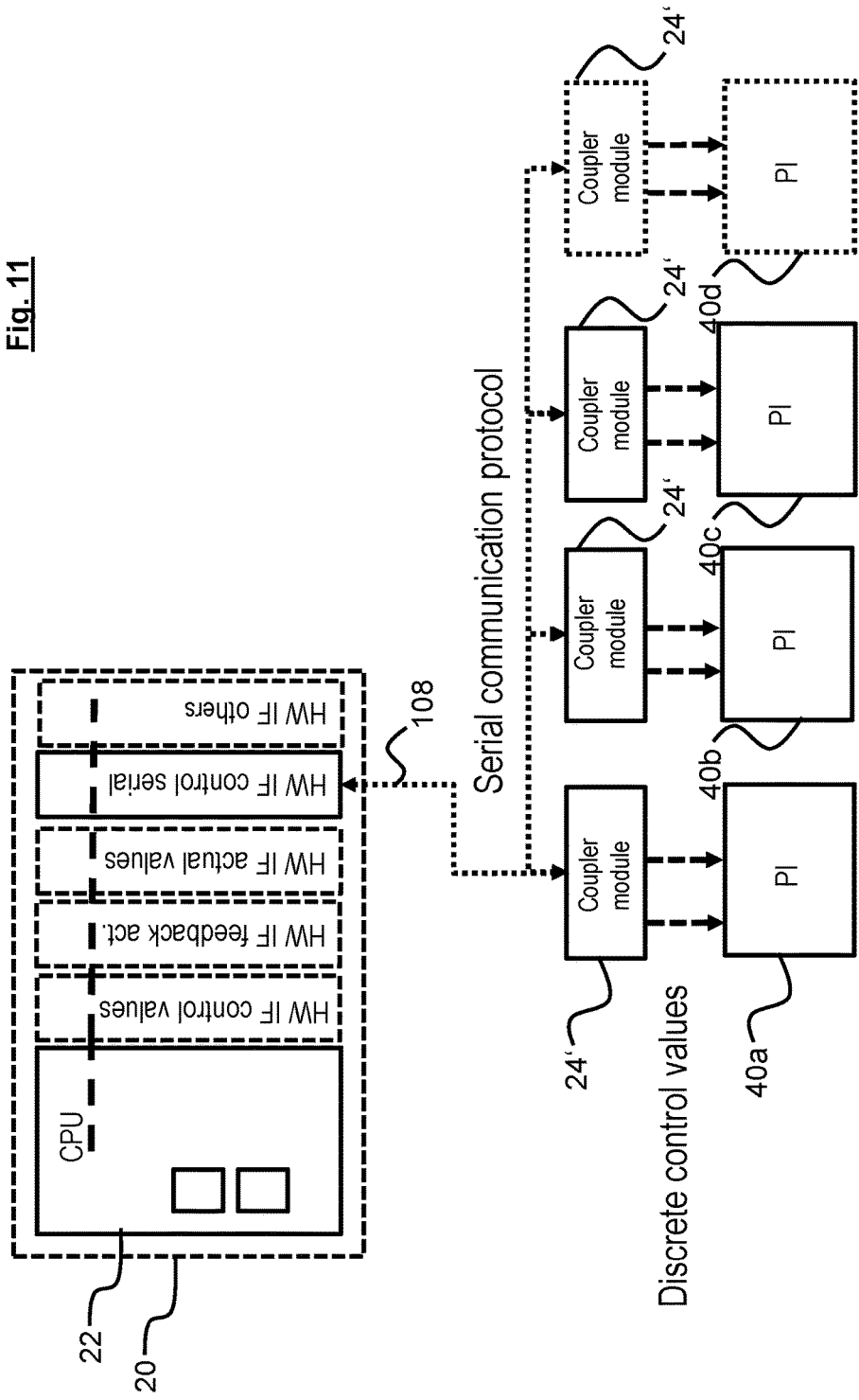

DEVICE AND METHOD FOR CONTROLLING DECENTRALIZED POWER GENERATION PLANTS

TECHNICAL FIELD

The present disclosure relates to a method for controlling a power generation plant, to a control unit, and to a power generation plant comprising a control unit.

BACKGROUND

The proportion of electricity generation by decentralized power generation plants (PGP) has considerably grown internationally in recent years. The amount of photovoltaic power worldwide installed has increased from one gigawatt to more than 100 gigawatts in the period from 2000 to 2012. Due to the decentralized nature of this type of energy generation and the associated temporary reversal of the load, new challenges arise for network operators. For example, an over-supply of active power in the network leads to an increase in mains voltage and frequency. In order to be able to ensure network stability, corresponding laws and directives have been put into effect at national level in the last few years, which regulate the technical conditions for the network connection of decentralized energy generation plants. Even decentralized PGPs now have to make their contribution to a high degree of network stability.

In Germany, since 2012 the Renewable Energy Sources Act (Erneuerbare-Energien-Gesetz, EEG) has been requiring the participation of renewable energy generation plants in feed-in management, in order to limit active power. This is independent of the voltage level at which the plant is connected to the network. The requirements for apparent power control are listed in VDE-AR 4105 for the low voltage level and in the technical guideline for generation plants at the medium voltage network of the BDEW (Federal Association of Energy and Water Management) for the medium voltage level. Internationally there are technically comparable legal conditions, for example CEI 16 (medium voltage) and CEI 21 (low voltage) in Italy. Even though the connection rules differ in detail at national level, the basic task is always the same: the goal is to keep the network frequency and voltage in a range which guarantees the stability of the network.

An essential technical challenge results from the lack of standardization of the protocols via which the power inverters exchanges data. For this reason, the available solutions are typically a proprietary approach of the respective manufacturer of the power inverter or of a third-party provider. However, solutions from third-party suppliers are usually limited to one power inverter model, so they cannot be used universally, just like the inverter-specific solutions of the power inverter manufacturers. However, this is also a disadvantage when power generation plants are constructed with power inverters from different manufacturers, for example, or when power generating plants of different types are combined in the same supply network.

A further problem of the network operator results from the lack of standardization with regard to the remote control equipment which is used to transmit the active and reactive power target values and for feedback of the actual values of the plant to the network operator. In practice this means that additional communication gateways must be installed between the PGP controller and the remote control equipment of the network operator.

GENERAL DESCRIPTION

Against this background, the Assignee of the present application, Phoenix Contact, has developed a PGP controller function which supports system integrators in complex power generation plants (PGP) such as photovoltaic generators, wind power plants, combined heat and power (CHP) generators or a combination thereof.

A resulting object of the present disclosure is to provide a PGP controller which exhibits high flexibility and/or modularity.

A further aspect of the object is to make the PGP controller cost-effective.

A further aspect of the present disclosure relates to a method for controlling one or more decentralized power generation plants.

The present disclosure also provides a power generation plant comprising a PGP controller.

Other objects will become apparent from the following description and useful features which are obtained with specific embodiments.

The object is achieved by the subject matter of the independent claims. Advantageous embodiments are specified by the subject matter of the dependent claims.

The present disclosure includes a control device for a decentralized PGP, a method for controlling decentralized PGPs, and a method for commissioning decentralized PGPs, for example for photovoltaic systems.

In network-linked decentralized power generation plants, generators produce electrical energy. Before feeding into the mains network, the electrical voltage has to be adapted to the network using power converters and optionally transformers. In the case of a high proportion of energy input from decentralized power generation plants, it may become necessary in order to maintain network stability to control the amount of reactive power and/or active power fed into the electrical power supply network by the decentralized power generation unit, for example as a function of the actual network voltage, network frequency, and active power at the network linking point of the decentralized generation unit. This may be accomplished by a control access via a communication protocol and/or via binary control signals to the power inverters employed. In other words, by controlling one or more power inverters(s) of a decentralized energy generation unit it is possible to control the above mentioned parameters and thus finally the power output of the decentralized power generation unit into the electrical supply network.

In the method according to the present disclosure for controlling decentralized power generation plants, the following steps are performed. First, a data base is created from which the control instructions can be generated. For this purpose, control commands which are provided or transmitted by the supply network operator, for example as a remote control signal, may be received. Alternatively or cumulatively, supply network parameters may be measured and may be used by a control module, for example, to automatically carry out the relevant calculations. Supply network parameters include, for example, supply network voltage and supply network frequency.

Alternatively or additionally, electrical parameters of the decentralized power generation unit may be measured and supplied to the processing. Examples of such parameters are the reactive power input or the active power. Preferably, the supply network parameters and/or the electrical parameters of the decentralized PGP are measured at a network linking point of the decentralized PGP.

The received control commands and/or the measured supply network parameters are processed in a further step. The control module may be used for the processing.

In response to the received control commands and/or the measured supply network parameters, control signals for controlling a first power inverter are generated in a further step. In other words, the control commands are translated into modification instructions for the power inverter. In this case the type of the power inverter is taken into account, which is stored in a memory for further use preferably already upon commissioning.

The type of the power inverter is relevant because different types of power inverters may not only have different interfaces, but may also use different types of communication protocols. The type of the power inverter must therefore be taken into account already when generating the control signals. For example, the power inverter may be selectable from a predefined list. The predefined list is preferably modifiable so that newly developed power inverters and communication protocols can be taken into account.

In today's decentralized PGPs, typically one or more power inverters are installed between the generators of the plant and the supply network. The power inverter thus provides the electrical connection and adaptation to the specifications of the supply network. This is because it is the operation with a power inverter that makes such an adaptation to the supply network parameters possible at all. However, those decentralized PGPs which do not have a power inverter are also intended to be controllable with the present controller and method for controlling. For example, it is conceivable to directly throttle a wind turbine which directly generates alternating current, in order to adapt the electrical parameters to the supply network parameters.

In a further step, the generated control signals are transmitted to an inverter interface for being output to the first power inverter. The inverter interface is preferably already selected in such a way that it can be connected to the power inverter of the decentralized PGP to be used.

In a further step, plant parameters of the decentralized PGP are adapted so that the target values of the supply network operator and/or limits of the supply network are met. In other words, typically the power output of the decentralized PGP is adapted, i.e. throttled. The adaptation of the decentralized PGP is accomplished using the first power inverter in response to the control signals received by the power inverter from its inverter interface.

Particularly preferably, the described method and the described power generation plant controller enable to control more than one power inverter at the same time. In this case, the first and second power inverters may be different from each other. For example, the first and the second power inverters may be used in the same decentralized PGP, however it is likewise possible that the first power inverter is used in the first decentralized PGP and the second power inverter in a second decentralized PGP. The structure of the decentralized PGP and the association of the first power inverter and of the second power inverter to a decentralized PGP is preferably stored in advance for further use.

The second power inverter is representative of one or more further power inverters. Thus, it is also possible for the power generation plant controller to simultaneously control 3, 4 or more different power inverters at the same time.

For controlling the second power inverter which is different from the first power inverter, second control signals are preferably generated from the control commands. In a further step, the generated control signals are then transmitted to a second inverter interface for supplying the control signals to the second power inverter. In other words, a plurality of preferably different inverter interfaces is provided, and each inverter interface is associated with a predefined type of power inverter. Optionally, a plurality of identical power inverters may be connected to one inverter interface. Typically, however, an inverter interface is associated with exactly one power inverter or one type of power inverter, so that for each power inverter a further inverter interface will be used.

In a further step, the plant parameters of the decentralized power generation plant are adapted by means of the first and second power inverters in response to the respective control signals received from the inverter interface. Plant parameter is, for example, the power output of the decentralized PGP.

The second power inverter is preferably arranged in a second decentralized power generation plant.

In terms of hierarchy it is assumed that the whole network of a power generation plant connected to a network linking point is a coherent PGP. Within a PGP which is connected to a network linking point, partial power generation systems may be provided, and each partial power generation system has associated therewith a controllable power inverter. Thus, the power inverters define the distribution of the PGP, while the network linking points determine the affiliation to a PGP. Therefore, a plurality of PGPs will have a plurality of network linking points.

A modular power generation plant controller (PGC) for controlling decentralized power generation plants comprises a programmable control module for generating inverter-specific control signals for controlling the first power inverter. In this case, the first power inverter is associated with the decentralized energy generation plant.

The modular PGC furthermore comprises a program memory of the control module for a control program. In other words, the control program may be stored in the program memory.

The control program preferably comprises software components which can be stored individually in the program memory, that is to say modularly, so that the program memory contains the respective software component which is suitable for executing the required functions. For example, one software component comprises the code for translating the control commands into control signals of a particular type of power inverter. By implementing a plurality of software components it is thus easily possible to control a plurality of different types of power inverters, for example, if the suitable software components are stored in the program memory.

Furthermore, the control module preferably comprises a processor for processing as well as for inputting and/or outputting signals or commands.

In other words, the control module provides all the processing functions, and one of the inverter interfaces, remote control signal interface, and the measuring device interface output the processed data in the form of signals.

The PGC comprises an extension system for modular addition of extension modules to the programmable control module.

The extension system is designed so that one or more extension modules can be added. For example, a simple extension system is implemented using pluggable bus connectors for directly coupling the modules to one another and enabling data exchange between the modules. A highly modular PGC permits to implement the required functions, for example the control of various types of power inverters. Moreover, this can be provided with a cost-effective and integrated platform.

Furthermore, the PGC comprises a first extension module which can be coupled to the programmable control module. The first extension module has at least one inverter interface, and is also referred to as an inverter interface module. The inverter interface module provides connection to the at least one power inverter. In other words, the signal connection line of the power inverter is directly connected to the power inverter on one end and is directly connected to the inverter interface of the PGC on the other end.

By means of the inverter interface module, inverter-specific control signals are output to the power inverter via the inverter interface.

Preferably, the PGC further comprises a second extension module. The second extension module stands for one or more further extension modules. A second one and optionally further inverter interface modules can be used. Alternatively or cumulatively, a remote control signal module, a measurement module, or a communication module may be used.

The second extension module as a second inverter interface module has at least one inverter interface for establishing the connection to a second power inverter. The second power inverter is preferably different from the first power inverter. By means of the inverter interface, the inverter-specific control signals are output to the second power inverter of the second inverter interface module.

The second extension module may comprise a remote control signal module with a remote control signal interface by means of which control commands can be received and forwarded to the control module. The remote control signal is generated individually by the respective network operator and is provided to the plant operator of the PGP via a path defined by the network operator. The remote control signal may as well already include a general plant control characteristic and/or a power inverter control characteristic.

Optionally, such a remote control signal is not provided. In this case, or if it is otherwise interesting, the second extension module may comprise a measurement module for detecting plant and/or supply network parameters. Supply network parameters include, for example, the reactive power input by the decentralized PGP, or the active power, optionally as a function of the current mains voltage, but also voltage and current input. These measured parameters may be provided directly to the PGC.

However, it is also possible to use the PGC to read the data from external measuring devices. In this case, the second extension module may comprise a communication module for reading plant measuring devices.

The control module and the first extension module are preferably arranged in a common control box. Furthermore preferably, the control module, the first extension module and/or the second extension module are arranged in a common control box next to each other, so that they are adjacent to one another. The control module and the extension modules may then be coupled to each other by a plug-in bus connection. For example, the control module and the extension modules may be mounted on a common hat rail. In other words, this is an integrated power generation controller, and the components control module and extension module or extension modules thereof are arranged at the same location or, respectively, in a common control box and are influencing the power generation plant preferably from outside. For example, the common arrangement of control module with extension modules constitutes an integrated control center.

In another embodiment, the control module and the at least one extension module are arranged in a central control or connection box of the power generation plant. The central control box may here assume the functions of a generator connection box known to a person skilled in the art. The accommodation of the PGC in the central control box is particularly useful in that no further separate box is needed for the PGC. It is actually due to the small size and/or the small space requirement of the PGC presented here, that an installation in the central control box is basically possible at all. In other words, the main functions of the wire harness assembly and/or power distribution (generator connection box) and system control (PGC) are combined in the central control box. Therefore, for example, an integrated energy distribution and control center is realized.

In this embodiment, the first inverter interface module is connected to the first power inverter of the decentralized power generation plant. The second inverter interface module is connected to the second power inverter. In this case, the second power inverter may be a power inverter of the decentralized power generation plant or a power inverter of the further decentralized power generation plant.

Therefore, if a further decentralized power generation plant is controlled by the one control module together with the decentralized power generation plant, the second inverter interface module may be connected to the power inverter of the further decentralized power generation plant. In other words, a plurality of decentralized power generation plants which may have different power inverters can be simultaneously controlled by one control module with regard to the supply network parameters to be complied with.

The at least second extension module may be arranged in a second control box. This means that the first extension module is arranged in the control box, and the second extension module, for example the second inverter interface module, is arranged remote from the first extension module and control module in the second control box. This can be useful if two (or more) PGPs are to be controlled by the control module, which are situated at a distance from each other, for example. The distance between the control box and the second control box may be bridged by means of a data connection line for data exchange. Common Ethernet connections are optionally also suitable for this purpose. In other words, the extension system may comprise the data connection line for exchanging data between the control module and the second extension module. In this case, the control module exchanges data with the second extension module via the data connection line.

The program memory of the control module may preferably store predefined software components. The predefined software components are preferably adapted to communicate with the respective extension module and/or the further extension module.

A decentralized power generation plant according to the present disclosure comprises electrical power generators. The generators generate the energy of the PGP. The generators are, for example, photovoltaic modules, wind turbines, biomass systems and/or combined heat and power units. The aforementioned various types of generators may belong to separate PGPs, however a PGP (which is defined over the network linking point) may as well include various types of generators. For example, a small plant may comprise a combination of a plurality of solar modules and a smaller wind turbine and therefore constitutes a decentralized PGP as a whole. In this example, it is possible for the solar modules to feed the first power inverter and for the smaller wind turbine to feed the second power inverter. The first power inverter and solar modules are therefore part of a first partial generator of the decentralized PGP, the second power inverter and the wind turbine are part of a second partial generator of the decentralized PGP.

The power inverter permits to adapt the electrical parameters of the decentralized power generation plant, i.e. the "plant parameters", to those of the supply network and/or to target values.

In the example described above, the electrical parameters of the first partial generator can be adapted by means of the first power inverter. The electrical parameters of the second partial generator can be adapted by means of the second power inverter. The control module controls the first and second power inverters in a manner so that overall the nominal target values of the network operator or of the parameters are complied with.

The decentralized PGP therefore comprises a modular power generation plant controller as described above for controlling parameters, for example the output power, of the decentralized power generation plant.

The present disclosure will now be explained in more detail by way of exemplary embodiments and with reference to the figures in which the same and similar elements are in part provided with the same reference numerals, and the features of the different exemplary embodiments may be combined with each other.

BRIEF DESCRIPTION OF THE FIGURES

In the figures:

FIG. 6 in an overview of the communication connection to the distribution network operator;

FIG. 7 shows another embodiment of the communication connection to the distribution network operator;

FIG. 8 is a diagram similar to FIG. 7, illustrating a further alternative;

FIG. 9 shows a power generation controller without remote control signal;

FIG. 10 shows a further embodiment of a power generation controller without remote control signal; and FIG. 11 shows an embodiment with decentralized inverter interface modules.

DETAILED DESCRIPTION

Figure 1:
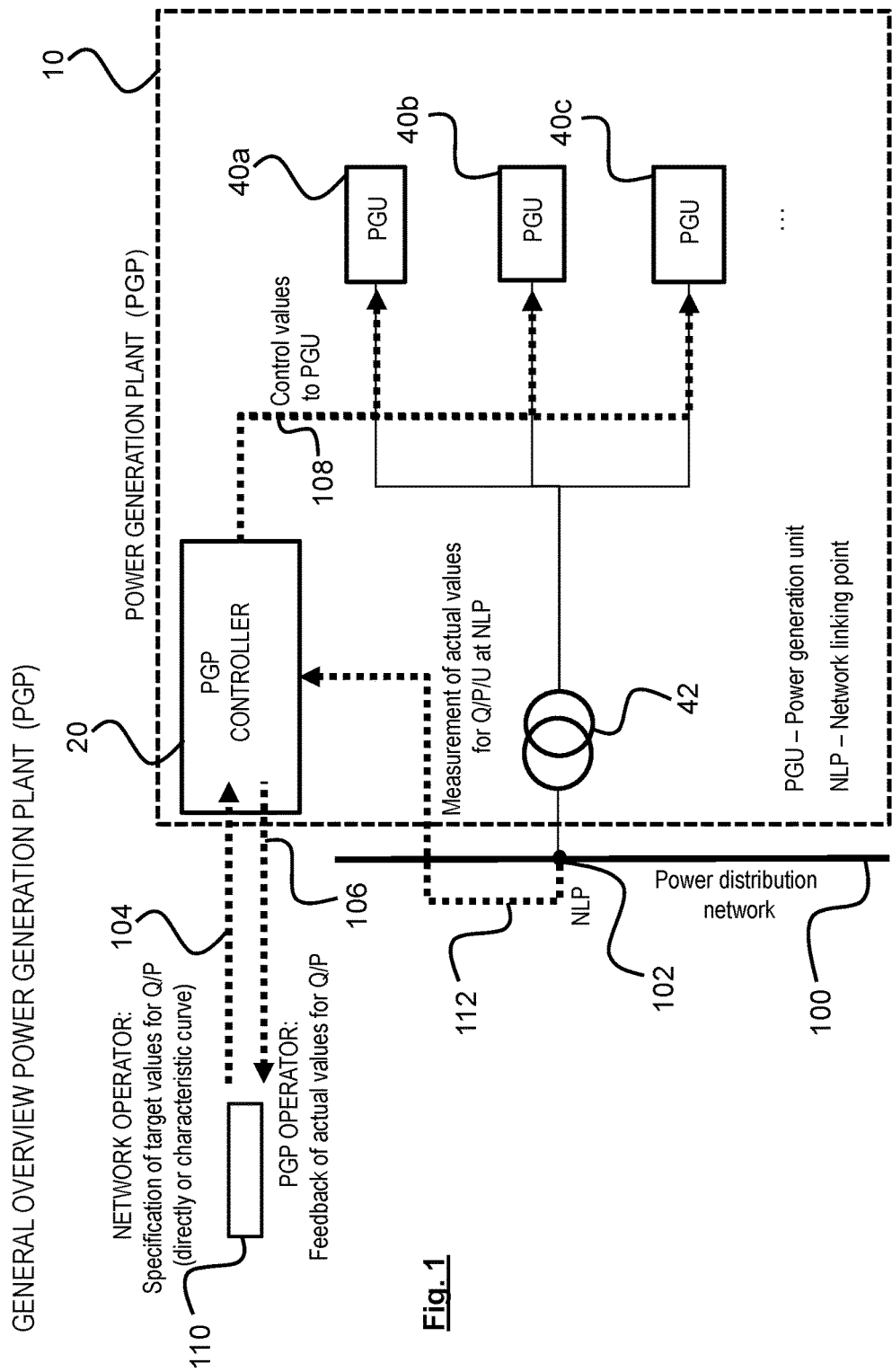
FIG. 1 is an overview of a typical power generation plant.

FIG. 1 shows a typical power generation plant 10 which is connected to a power distribution network 100 via a network linking point 102.

Power generation controller 20 (PGC) receives target value specifications, for example for the reactive power Q or active power output P from the network operator 110, by way of the remote control signal 104. The target values may be transmitted, for example in form of a direct transmission of values, or may be stored locally in the form of a characteristic curve, for example in the PGC 20. The characteristic curve may as well be transmitted in conjunction with remote maintenance, for example, to be stored in the PGC 20. Furthermore, in the illustrated embodiment various actual values of the plant parameters are measured at the network linking point 102. The actual values of the plant parameters are processed by the PGC 20 and may be matched to the target values of the remote control signal 104, for example.

From the remote control signal 104 and/or the plant parameters, control signals for the power generation units 12 (PGU), for example for the power inverters 40, are generated and transmitted to the power inverters 40a, 40b, 40c. The three power inverters 40a, 40b, 40c are adjusted by the control signals in such a way that the corresponding electrical parameters are adapted to the specifications.

In the embodiment, a transformer 42 is connected downstream of power inverters 40a, 40b, 40c, which adapts the output voltage of the power inverters 40a, 40b, 40c to the voltage level of the supply network 100. For example, the supply network 100 is a medium voltage network 100, whereas the power inverters 40a, 40b, 40c provide low voltage, for example, i.e. about 400 V (for example in Europe) or 480 V (for example in North America), depending on the specifications of nationally valid standards.

A feedback 106 of actual system values of the PGP 10 to the network operator 110 may also be effected by the PGC 20.

Figure 2:
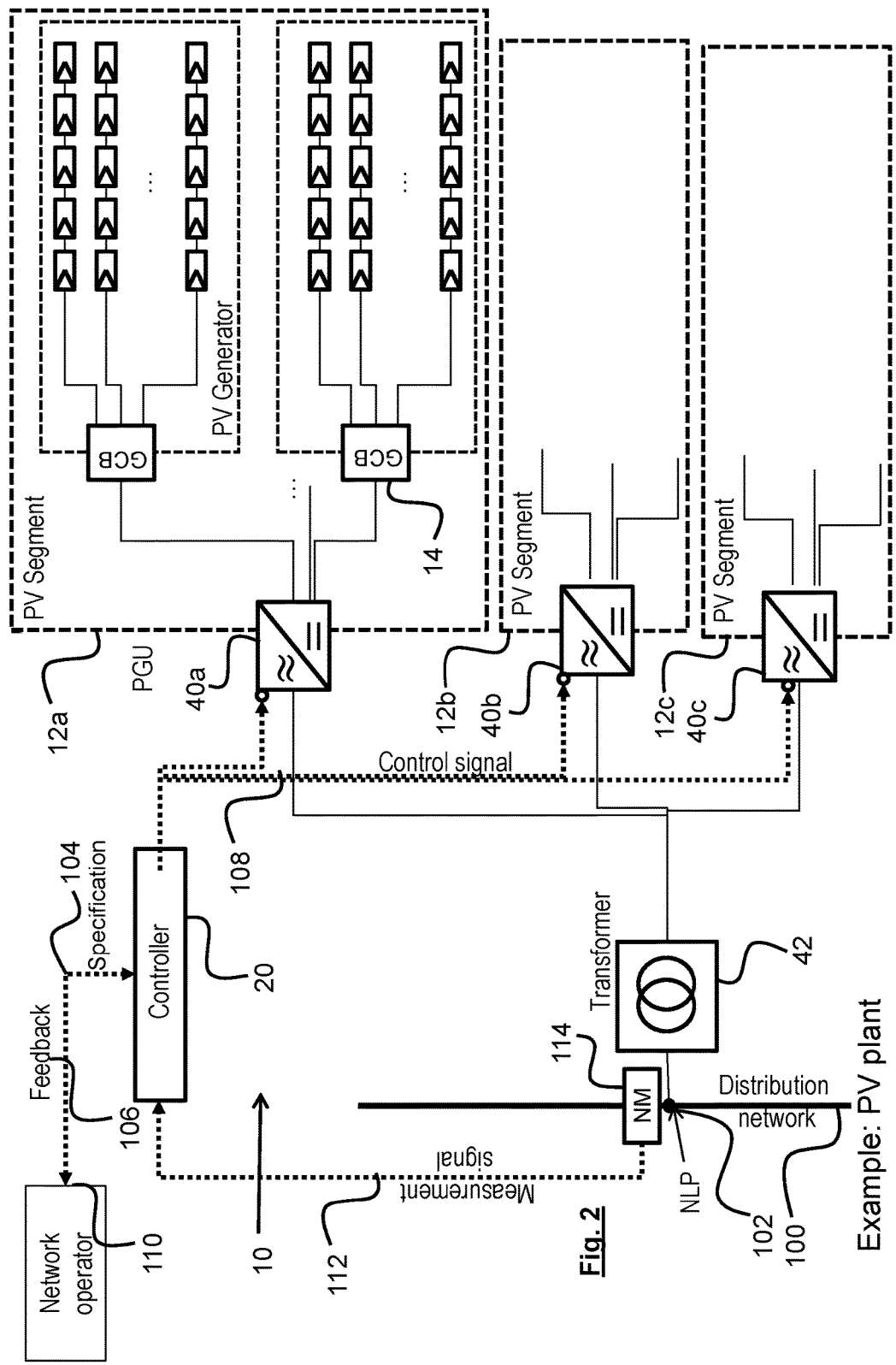
FIG. 2 shows a further power generation plant with a plurality of partial generators.

FIG. 2 shows a further schematic overview of a decentralized power generation plant 10 in the form of a photovoltaic generator 10a. The decentralized PGP 10 comprises a plurality of partial generators 12a, 12b, 12c. Each partial generator 12a, 12b, 12c has a power inverter 40a, 40b, 40c associated therewith. Thus, FIG. 2 shows three power generation units (PGU), which jointly form the decentralized PGP 10. Furthermore, a generator connection box (GCB) 14 is shown in the first PGU 12a.

The network operator 110 outputs, by way of the remote control signal 104, specifications to the PGC 20 for controlling the decentralized PGP 10. PGC 20 converts the specifications by generating the control signal 108 from the specifications which is supplied to the power inverters 40a, 40b, 40c via the inverter interface module 24. The power inverters 40a, 40b, 40c are thus controlled in response to the specifications of the remote control signal 104. In the embodiment shown, the PGC 20 also provides a feedback 106 to the network operator 110.

In the embodiment of FIG. 2, a network monitoring (NM) unit 114 is located at network linking point 102, which monitors the plant parameters of decentralized PGP 10. The measurement signal 112 obtained by the network monitoring 114 is supplied to the PGC 20 and processed by the PGC 20.

Figure 3:
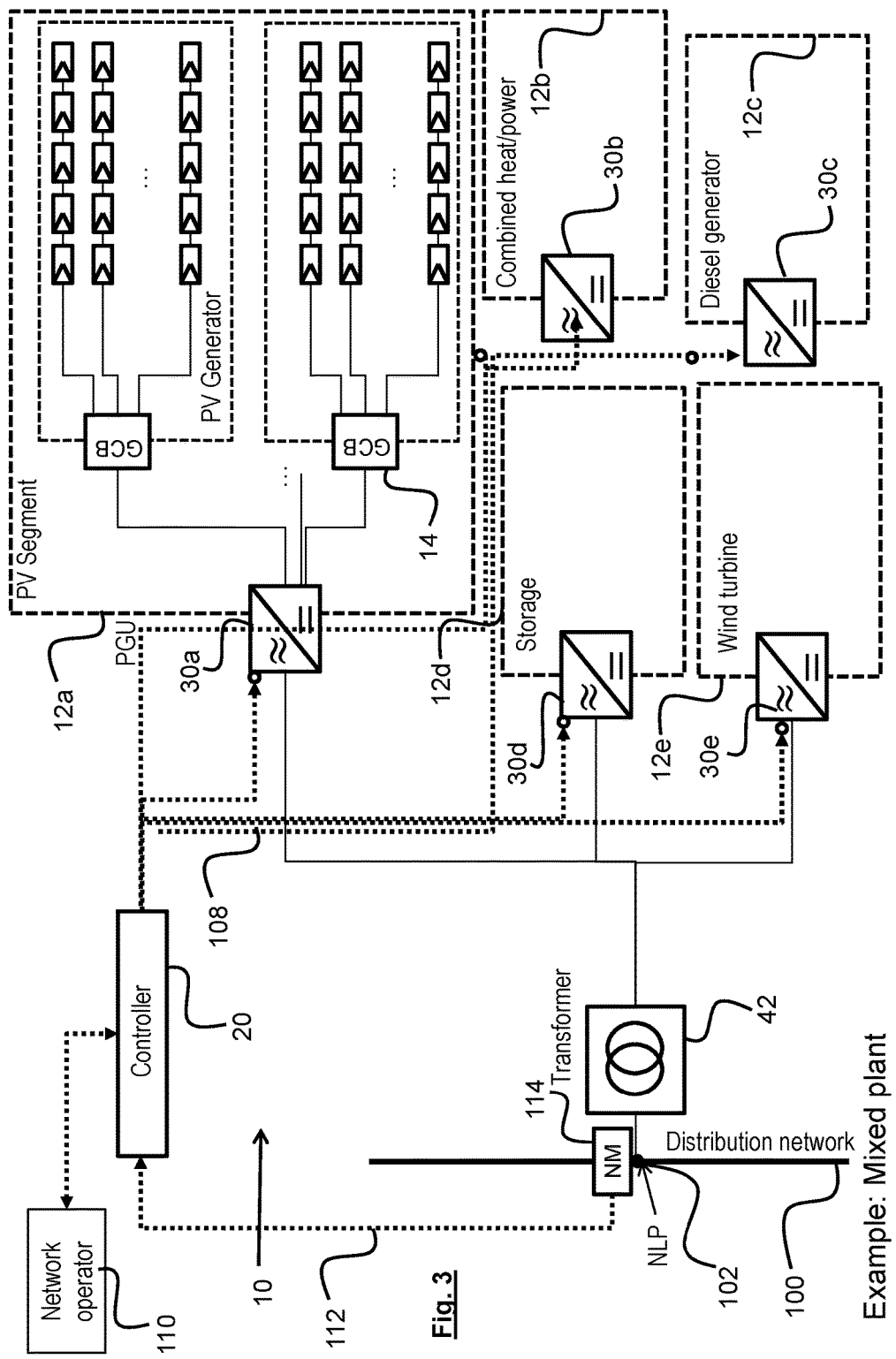
FIG. 3 is a diagram similar to FIG. 2, with different types of partial generators.

FIG. 3 shows a further embodiment of a decentralized PGP 10 comprising different power generators 12a, 12b, 12c, 12d, 12e. 12a is a photovoltaic generator; a further partial generator of the decentralized PGP 10 is a combined heat and power unit 12b. Further partial generators of the decentralized PGP 10 may include a diesel generator 12c, a buffer storage 12d and/or a wind turbine 12e. Thus, even highly complex plants with mixed operation can be controlled by one PGC 20. Each partial generator 12a, 12b, 12c, 12d, 12e constitutes a power generation unit PGU which can be adjusted with respect to the plant parameters using appropriate control signals.

Figure 4:
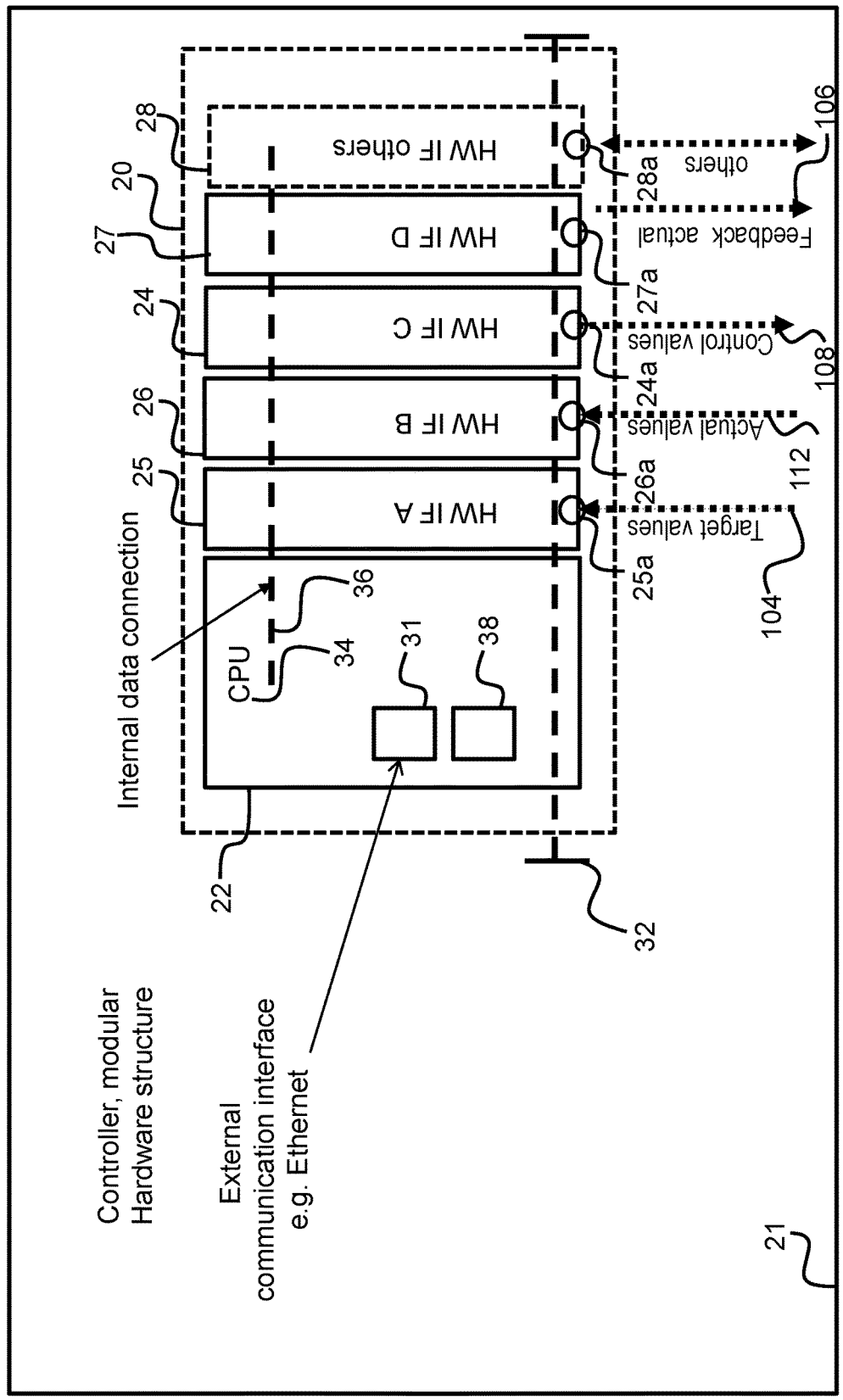
FIG. 4 shows the configuration of a power generation plant controller (PGC) in a control box.

FIG. 4 shows a power generation controller 20 (PGC) in a switch box 21. The illustrated PGC 20 comprises a control module 22 with a processor (CPU) 34. By way of an extension system 36, extension modules 24, 25, 26, 27, 28 may be connected to control module 22.

Control module 22 virtually forms the "heart" of modular PGC 20, with processor 34 and a program memory 38. In this embodiment, control module 22 furthermore comprises an additional communication interface 31. This is, for example, an Ethernet interface 31 for maintenance of the control module 22, that means for example for uploading software components into program memory 38 and/or for uploading new program versions.

Here, the extension system 36 also includes an internal data connection. The data connection implemented as a plug-in bus system herein is therefore an integrated extension system 36.

By way of extension system 36, a first inverter interface module 24 is now connected to the control module 22. Inverter interface module 24 has an inverter interface 24a, by means of which control values are output to the power inverter 40. Inverter interface 24a is selected so that it is appropriate for the power inverter 40 to be addressed, so it constitutes an inverter-specific interface 24a. In the embodiment shown, the inverter interface module 24 is an output module since the control values are transmitted to the power inverter 40.

A remote control signal module 25 is arranged adjacent to control module 22. Remote control signal module 25 comprises a remote control signal interface 25a where the remote control signal 104 including the target values is received. Remote control signal module 25 forwards the remote control signal to control module 22 for further processing. Remote control signal module 25 is an input module because the remote control signal module 25 receives the remote control signal 104.

PGC 20 furthermore comprises a measurement module 26 having a measured value interface 26a. The actual values of the plant parameters are transmitted in suitable manner to measurement module 26 for further processing in control module 22.

Moreover, PGC 20 comprises a communication module 27 having a communication interface 27a. In the embodiment shown, feedback data 106 are transmitted to the network operator 110, i.e. for example the actual values of the plant parameters.

Thus, PGC 20 with the modules 22, 25, 26, 27 as illustrated in the exemplary embodiment is an integrated power generation plant controller 20, with all the relevant control and interface components being arranged in a common control box 21. Integrated PGC 20 is particularly useful in that all components are accessible in one place, so that in case of maintenance or modification a technician can make all settings or modifications at a central location. In addition, the components may be optimally matched to each other, so that losses which might occur due to a faulty conversion of the control signals by external components, for example directly at the power inverter, can be reduced or avoided. Finally, the short communication paths between modules 22, 25, 26, 27 ensure rather short transmission times of the corresponding signals so as to provide for quick responses to any changes in the environmental conditions. This is particularly interesting in the case of regenerative energy generation 12, such as, for example, wind power 12e, solar power, and also power from a biomass power system 12b, since power generation is sensitive to environmental conditions in this case and the optimum parameters of power generation may constantly be adapted, i.e. controlled.

A further extension module 28 symbolizes the flexibility of the presented PGC 20. Virtually any function modules can be coupled to control module 22, mostly as interface modules, in order to realize the range of functions desired by the user. In the illustrated form, extension module 28 is an input/output module, since data may both be received and transmitted.

In FIG. 4, the complete PGC 20 is mounted on a common hat rail 32, i.e. latched thereto.

Figure 5:
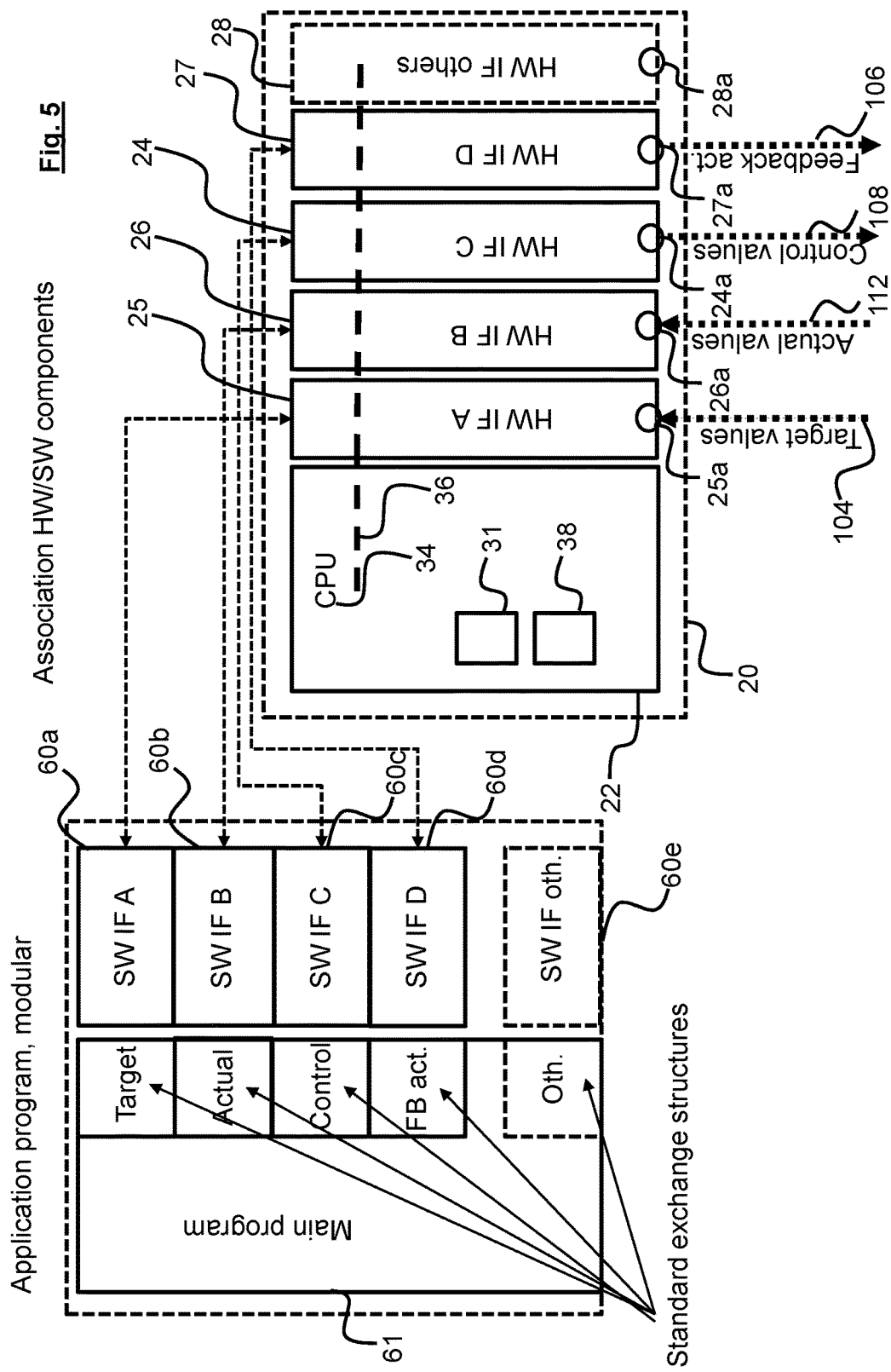
FIG. 5 shows the interaction of the modular program components with the modular extension modules.

FIG. 5 shows the interaction of program components 60 with the respective extension modules 24, 25, 26, 27, 28. For example, there are program components 60 which are associated with exactly one respective extension module 24, 25, 26, 27, 28 to perform the desired function. Other program components may include the main program 61 which ensures communication with the system architecture (CPU 34, memory 38, external communication interface 31, etc.), similarly to an operating system.

The main program 61 may have standard exchange structures for internal communication or data exchange of the main program 61 with program components 60a, 60b, 60c, 60d, 60e, in order to ensure that the modularity of the overall system is also implemented on a software level. In other words, the main program 61 may be preinstalled in the control module 22 with the prefabricated standard exchange structures, and in accordance with the addition of further extension modules 24, 25, 26, 27, 28, program components 60a, 60b, 60c, 60d, 60e can be uploaded into the control module 22.

By way of example, signal processing starts with a remote control signal 104 and/or the measured value signal 112, which is alternatively or cumulatively processed by control module 22. Remote control signal module 25 has associated therewith a program or software component 60a by means of which the received remote control signal 104 is processed. Measured value module 26 has associated therewith a program component 60b by means of which the measured value signals 112 are processed.

An interaction with main program 61 makes it possible, for example, to access predefined data stored in program memory 38. Such predefined data comprise, for example, the specifications of the distribution network operator in the form of a characteristic curve or the limit values of the plant parameters to be complied with.

Based on the processing result of remote control signal program component 60a and/or the processing result of measured signal program component 60b, a control signal is generated and forwarded to inverter interface program component 60c. Inverter interface program component 60c translates the control signal so that it is appropriate for the type of power inverter 40, i.e. with the correct communication protocol, for example. This corrected control signal is transmitted to the inverter interface module 24 and finally transferred to the power inverter 40 via inverter interface 24a.

The processing result of the remote control signal program component 60a and/or the processing result of the measurement signal program component 60b may also be transferred to the feedback program component 60d, which generates a feedback signal 106 for the distribution network operator 110. The feedback signal 106 may then be transmitted to the distribution network operator 110 by way of communication module 27 and the associated communication interface 27a.

Further program components 60e may be associated with other extension modules 28 in order to perform corresponding functions. For example, the further program component 60e may be a second inverter interface program component

60*e* which addresses a second inverter interface module 28 for controlling a second power inverter 40, 40*a*, 40*b*, 40*c*, 40*d*, 40*e***.

FIG. 6 shows a further option for the communication connection of the PGC 20 with the distribution network operator 110 for transmitting the remote control signal 104. On the distribution network operator's side, the target values are transmitted, wired or wirelessly, to a remote control box 118 using a serial remote control protocol in this case. The actual values may also be transmitted using the remote control protocol. On the plant's side, the specification values are forwarded to the PGC 20 in a different signal form. In other words, the remote control box 118 translates the signals from the remote control protocol into a plant protocol.

On the plant's side, the specified target values may, for example, be transmitted as a proportional analog signal to the single-channel or multi-channel remote control signal module 25. It is also possible to transmit a proportional analog signal from communication module 27 to remote control box 118.

On the plant's side, the specified target values may as well be transmitted to a suitable multi-channel digital remote control signal module 25 in the form of a bit-coded digital signal in definable steps. The form of transmission is announced by distribution network operator 110, so that the extension module which has to be used accordingly can be selected and employed in the PGC 20.

FIG. 7 shows a further embodiment variant of the communication with the distribution network operator 110. In this case, the network operator 110 exchanges the data with the remote control box 118 using a serial remote control protocol. On the plant's side, a local communication protocol is employed, for example also a serial communication protocol. In this variant, the employed extension module, namely remote control signal module 25 of PGC 20, is adapted to forward both input and output data, so that not only the remote control signal 104 can be received, but also the actual system values 106 can be transmitted to the remote control box 118.

The control characteristics for the adaptation of the decentralized PGP 10 to the supply network 100 may be defined by the supply network operator 110 of the supply network 100 to which the decentralized power generation plant 10 is connected, in the connection conditions.

In the example shown in FIG. 8, distribution network operator 110 and PGC 20 communicate directly with each other. Therefore, in this example, PGC 20 is adapted to receive and transmit data which is directly translated into the used remote control protocol. In the form illustrated herein it is even conceivable to completely omit the remote control signal module 25 and to provide the remote control signal interface 25*a* on control module 22. This appears possible and useful provided that the various distribution network operators 110 could agree on a communication standard and different remote control signal modules 25 would not be required anymore.

FIG. 9 shows an embodiment variant of PGC 20, in which no remote control signal 104 is transmitted by the distribution network operator 110. Rather, the parameters of the distribution network 100 and the plant parameters, for example current, voltage, phase are measured at the network linking point 102, and the measured values are transmitted to measurement module 26. The measurement module forwards the data to control module 22 to be processed there by the CPU 34 and program components 60 in order to obtain the relevant values such as, for example, for power P, frequency f, reactive power Q, phase, etc. Based on the relevant values, a control signal can be generated, transferred to inverter interface module 24 and finally supplied to power inverter 40.

FIG. 10 shows yet another embodiment of PGC 20, in which no remote control signal 104 is used. The relevant parameters are measured at network linking point 102 by way of decentralized network monitoring 114 in this case, and the already processed measuring results are transmitted to the PGC 20 and received by measurement module 26. In contrast to FIG. 9, FIG. 10 shows an embodiment with partial generators, so that a plurality of power inverters 40, 40*a*, 40*b*, 40*c* receive their control signals from the first and possibly the second inverter interface modules 24 in order to adapt the plant parameters in accordance with the specifications.

Finally, FIG. 11 shows an embodiment of the PGC 20 in which the power inverters 40, 40*a*, 40*b*, 40*c*, 40*d* are arranged in distributed manner and each power inverter has associated therewith a decentralized second inverter interface module 24' as a "coupler module". In other words, the coupler modules are inverter interface modules 24' which are not arranged directly adjacent to the control module 22 but communicate with control module 22 via a data connection line 30. As in this example, this may be a serial communication protocol for addressing the coupler modules 24'. So, the control values are transmitted to power inverters 40, 40*a*, 40*b*, 40*c*, 40*d* via second inverter interface modules 24' which are, for example, locally associated with the power inverters 40.

If appropriate, the second inverter interface modules 24' may receive the control values via a serial communication protocol and locally translate them into discrete control values, e.g. an analog standard signal which is applied to analog inputs at power inverters 40, 40*a*, 40*b*, 40*c*, 40*d*. In this embodiment, a software or program component 60 adapted to the communication protocol, to the parameter set of the power inverter, and to the inverter interface module 24 provides for the data transfer to the main program via the standard data exchange structure. Optionally, the coupler modules may provide a return channel for transferring data from the power inverter to the PGC 20**, for diagnostic or adjusting purposes.

In summary, the present PGP controller 20 can be supplemented by interfaces and functions in order to be able to be adapted according to the respective application requirements. By providing a basic function in hardware (HW) and software (SW) this can be realized by providing the disclosed controller functions. A skilled user may modularly supplement and adapt the basic function of the controller by interfaces, based on a modular system of HW and SW modules, without having to change the basic function of the controller.

The extensions of the basic function relate, for example, to HW interfaces 24, 25, 26, 27, 28 and SW interfaces 60, 60*a*, 60*b*, 60*c*, 60*d*, 60*e* for reading actual values of the controlled parameter, for reading externally specified target values for this controlled parameter, and for outputting the control values into the control path. For example, in a basic embodiment the described interfaces may be designed as analog input and output interfaces.

A further optimization of the system is a superimposed overall control of different separately controlled partial systems 12*a*, 12*b*, 12*c*, 12*d*, 12*e*. If the reception of the target values, the detection of the actual values, and the transmission of the control values 108** are intended to be effected via interfaces other than analog interfaces, then the basic function of controller 20 is retained and only the HW modules 24, 25, 26, 27, 28 and the interface modules 60, 60a, 60b, 60c, 60d, 60e will be adapted.

The modular extension capability allows the PGC controller 20 to be individually adapted to the respective application. Mixed operation of different types of power generation plants (e.g. wind, solar, diesel) 12a, 12b, 12c, 12d, 12e is also possible, and also the combination with energy storage systems (battery systems).

In a particularly useful embodiment, the basic controller function may be provided by a programmable logic controller (PLC) 22 for which basic programming is also provided. Depending on the hardware interfaces required for its overall application, e.g. depending on the interfaces of the power inverters to be driven (e.g. RS485 communication protocol), the read-out measurement technology (e.g. power meter with S0 output) and the superimposed master plane to be connected for specifying target values (e.g. remote control protocol), the user selects the relevant HW interface modules and supplements the PLC 22 by these modules 24, 25, 26, 27, 28, or enables these interfaces in the PLC 22.

In the programming environment of the PLC 22, the basic programming of the control function is supplemented by the required interfaces with the SW components 60, 60a, 60b, 60c, 60d, 60e associated with the selected HW blocks 24, 25, 26, 27, 28.

In an exemplary embodiment inline controllers of the 100 or 300 power class which may be programmed according to IEC 61131, may form the control module 22. The present disclosure provides an extensive portfolio of extension modules 24, 25, 26, 27, 28 for the compact controllers, for example for capturing input/output (I/O) data and forwarding them via different hardware interfaces (e.g. 24a, 25a, 26a, 27a).

Due to the flexibility on the hardware side, the user may optimally adapt the solution to the requirements of the respective project, for example with regard to the coupling to power inverters 40 from different manufacturers, network analysis systems, or remote control interfaces 25a. Should new requirements on the interface side arise over time, the existing applications may be retrofitted with additional modules or existing components may be replaced by new ones.

The modularity and flexibility of the hardware has also been transferred to the software. The Assignee of the present application, Phoenix Contact, has developed extensive function block libraries 60, 60a, 60b, 60c, 60d, 60e based on IEC 61131, for example for solar applications, which considerably reduce the engineering complexity for the system integrator. A further relevant component of the solution is the controller function. The components 60 for detection of actual values and transmission of target values to the different power inverters and for the remote control technology of the network operator are coupled to this controller function via special defined interfaces.

The function block library SolarWorx that has been developed allows, on the one hand, simple integration of almost all leading power inverters 40 into the respective photovoltaic system 10, 12a. In addition, communication components 60 are available for coupling power meters for network monitoring at the feed-in point. Besides the network analyzing devices of the EMpro product family, similar components of third-party providers can also be supported. A major focus is the integration of Modbus-based communication protocols which are widely used in the solar field. The work of the programmer is thus largely reduced to the linkage of pre-tested software components 60. Fine parameterization, for example with regard to the control parameters, may then be performed in the plant via Web-based user interfaces which can be particularly adapted to the control modules.

The portfolio of hardware and software components optimally based on each other thus permits to reduce the engineering costs for the system integrator who, nevertheless, has a wide flexibility with regard to the interfaces to be supported. In this way, it is possible in many cases to avoid the use of additional communication gateways, for example for adaptation to the remote control protocol of the respective network operator. This function can be carried out by the controller itself. In addition, the use of PLC-based PGP controllers 20 provides the possibility of controlling even decentralized hybrid power generation plants 10 in which different PGU technologies (PGU—power generation unit) such as wind and photovoltaics are combined. If necessary, energy storage systems may also be integrated into such solutions.

In its network connection conditions, the responsible network operator typically specifies, for each PGP, the ranges for network frequency and network voltage to be complied with, and for reactive power control. These guideline values refer mostly to the network linking point 102 and not to the alternating voltage connection side of the power generation units (PGU) installed in the plant, i.e. power inverters 40, for example. In large photovoltaic systems 10, PGP controllers (power generation plant controllers) implement the requirements at the medium voltage power grid. They measure the voltage and reactive power at the network (grid) linking point using appropriate measuring equipment. The PGP controllers 20 then determine the relevant control values for the power inverters based on the deviation from the specifications of the network operator 110, which are either provided as a characteristic curve or in the form of externally specified target values. Because of the closed-loop control circuit, park-internal impedances are compensated. With respect to the network linking point of the power generation plant, certain conditions must be complied with for the supplied active and reactive power, which are dependent on external specifications or the characteristic curve stored in the plant. PGP controllers therefore detect the actual voltage and reactive power at the network linking points and then determine the respective control values for the power inverters. A hardware- and software-based solution by Phoenix Contact ensures that the engineering effort remains low.

It will be apparent to those skilled in the art that the embodiments described above have been given by way of example and that the invention is not limited thereto but may be varied in many ways without thereby departing from the scope of the claims. Furthermore, it will be appreciated that the features, regardless of whether they are disclosed in the specification, the claims, the figures, or otherwise, can define essential components of the invention alone, even if they are described together with other features.

LIST OF REFERENCE NUMERALS

10 Power generation plant (PGP)
12 Partial generator
12a Partial generator, photovoltaic generator
12b Partial generator, combined heat and power unit
12c Partial generator, diesel generator
12d Partial generator, buffer storage (battery system)
12e Partial generator, wind turbine
14 Generator connection box
20 Power generation plant controller (PGC)

21 Control box
22 Control module
24 Inverter interface module
24' Second inverter interface module
24a Inverter interface
24'a Inverter interface
25 Remote control signal module
25a Remote control signal interface
26 Measurement module
26a Measurement interface
27 Communication module
27a Communication interface
28 Additional extension module, second inverter interface module,
28a Second inverter interface
31 Communication interface, Ethernet interface
32 Hat rail
34 Processor (CPU)
36 Extension system
38 Program memory
40 Power inverter
40a, 40b, 40c First, second, and third power inverters, resp.
42 Transformer
60 Program components 60a, 60b, 60c, 60d, 60e
61 Main program
100 Supply network
102 Network linking point
104 Remote control signal
106 Feedback
108 Control signal
110 Network Operator
112 Measurement signal
114 Network monitoring

The invention claimed is:

1. A method for controlling decentralized power generation plants, comprising the steps of:
receiving at least one of control commands or measured supply network parameters;
processing the at least one of the received control commands or the measured supply network parameters;
generating control signals in response to the at least one of the received control commands or the measured supply network parameters for controlling a first power inverter;
transmitting the generated control signals to a first inverter interface for being output to the first power inverter;
adapting plant parameters of the decentralized power generation plant by means of the first power inverter in response to the control signals received from the first inverter interface;
generating second control signals for controlling a second power inverter arranged in a second decentralized power generation plant;
transmitting the generated second control signals to a second inverter interface for outputting the control signals to the second power inverter; and
adapting plant parameters of one or both of the decentralized power generation plants by means of the first and second power inverters in response to the respective control signals received from the inverter interface, wherein the first and second power inverters are controlled simultaneously to adapt the plant parameters of the one or both of the decentralized power generation plants to the supply network parameters.

2. A modular power generation plant controller for controlling one or more decentralized power generation plants, comprising:
a programmable control module for generating first inverter-specific control signals for controlling a first power inverter;
a program memory of the programmable control module for a control program;
an extension system for modular addition of extension modules to the programmable control module;
a first extension module with at least one inverter interface, which can be coupled to the programmable control module as a first inverter interface module for establishing a connection to the first power inverter and for outputting first inverter-specific control signals to the first power inverter via the inverter interface; and
a second extension module comprising a second inverter interface module with at least one inverter interface for establishing a connection to a second power inverter different from the first power inverter by type or manufacturer, and for outputting second inverter-specific control signals to the second power inverter via the inverter interface of the second inverter interface module,
wherein the program memory of the programmable control module stores a first predefined software component adapted to communicate with the first extension module and a second predefined software component adapted to communicate with the second extension module to enable control of a plurality of power inverters that vary by type or manufacturer.

3. The modular power generation plant controller as claimed in claim 2, wherein a further extension module comprises at least one of:
a remote-control signal module having a remote-control signal interface for receiving control commands and for forwarding the control commands to the programmable control module; or
a measurement module for detecting at least one of plant network parameters or distribution network parameters; or
a communication module for reading plant measuring devices.

4. The modular power generation plant controller as claimed in claim 3,
wherein the further extension module is arranged in a second control box;
wherein the extension system comprises a data connection line for exchanging data between the programmable control module and the second extension module; and
wherein the programmable control module exchanges data with the second extension module via the data connection line.

5. The modular power generation plant controller as claimed in claim 2, wherein the extension system comprises a data connection line for exchanging data between the programmable control module and at least one of the first or second extension modules.

6. The modular power generation plant controller as claimed in claim 2, wherein the programmable control module and the first extension module are arranged in a common control box.

7. The modular power generation plant controller as claimed in claim 2, wherein the programmable control module, the first extension module, and the second extension module are arranged in a common control box next to each other and are coupled by a plug-in bus connection.

8. The modular power generation plant controller as claimed in claim 7, wherein the programmable control module, the first extension module, and the second extension module are mounted on a common hat rail.

9. The modular power generation plant controller as claimed in claim 7, wherein, together with the programmable control module, the first extension module, and the second extension module, the remote-control signal module, the measurement module, and the communication module are arranged in the common control box next to each other and are couple altogether by the plug-in bus connection enabling data exchange between the modules.

10. The modular power generation plant controller as claimed in claim 2, wherein the programmable control module and the first extension module are arranged in a central control cabinet of the power generation plant.

11. The modular power generation plant controller as claimed in claim 2,
wherein the first inverter interface module is connected to the first power inverter of the decentralized power generation plant;
wherein the second inverter interface module is connected to a second power inverter of the decentralized power generation plant which is different from the first power inverter; and
wherein at least one further decentralized power generation plant is controlled by the control module together with the decentralized power generation plant, wherein the second inverter interface module is connected to the power inverter of the further decentralized power generation plant.

12. The modular power generation plant controller as claimed in claim 2,
wherein the control program comprises a main program; and
wherein the main program includes standard exchange structures for internal communication with modularly usable program components.

13. The modular power generation plant controller as claimed in claim 2, further comprising:
the programmable control module further including a programmable logic controller (PLC);
a remote-control signal module having a remote-control signal interface for receiving control commands and for forwarding the control commands to the programmable control module;
a measurement module for detecting at least one of plant network parameters or distribution network parameters; and
a communication module for reading plant measuring devices.

14. The modular power generation plant controller as claimed in claim 2, wherein all modules are arranged adjacent to each other constituting an integrated control center, influencing the power generation plant or plants from outside.

15. The modular power generation plant controller as claimed in claim 2, wherein the programmable control module comprises structures for an internal communication of the control program with the extension modules.

16. The modular power generation plant controller as claimed in claim 2, wherein the programmable control module provides a control signal to an inverter interface program component which translates said control signal into said first inverter-specific control signal or into said second inverter-specific control signal to be transmitted to the first or second inverter interface module.

17. The modular power generation plant controller as claimed in claim 2, wherein the programmable control module comprises a feedback program component, which generates a feedback signal to be transmitted to a distribution network operator.

18. The modular power generation plant controller as claimed in claim 2, wherein the first inverter-specific control signal is different than the second inverter-specific control signal.

19. A decentralized power generation plant, comprising:
a modular power generation plant controller for controlling parameters of the decentralized power generation plant, the controller including
a programmable control module for generating inverter-specific control signals for controlling a first power inverter;
a program memory of the programmable control module for a control program;
an extension system for modular addition of extension modules to the programmable control module;
a first extension module with at least one inverter interface, which can be coupled to the programmable control module as a first inverter interface module for establishing a connection to the first power inverter and for outputting inverter-specific control signals to the first power inverter via the inverter interface; and
a second extension module comprising a second inverter interface module with at least one inverter interface for establishing a connection to a second power inverter different from the first power inverter by type or manufacturer, and for outputting second inverter-specific control signals to the second power inverter via the inverter interface of the second inverter interface module,
wherein the program memory of the programmable control module stores a first predefined software component adapted to communicate with the first extension module and a second predefined software component adapted to communicate with the second extension module to enable control of a plurality of power inverters that vary by type or manufacturer;
electrical power generators including at least one of photovoltaic modules, wind turbines, biomass systems, or combined heat and power units; and
the first power inverter for adapting electrical parameters of the decentralized power generation plant to those of a supply network.

\* \* \* \* \*